Oct. 10, 1961      J. L. JENSEN      3,004,226

SEMICONDUCTOR INVERTER WITH CAPACITIVE LOAD MEANS

Filed May 1, 1958

*INVENTOR.*
JAMES LEE JENSEN
BY *Omund R. Dahle*
*ATTORNEY*

United States Patent Office 3,004,226
Patented Oct. 10, 1961

3,004,226
SEMICONDUCTOR INVERTER WITH CAPACITIVE LOAD MEANS
James Lee Jensen, St. Louis Park, Minn., assignor to Minneapolis-Honeywell Regulator Company, Minneapolis, Minn., a corporation of Delaware
Filed May 1, 1958, Ser. No. 732,334
13 Claims. (Cl. 331—113)

This invention relates generally to electrical apparatus and more particularly to electrical inverter apparatus designed to supply a current to an output load.

In many instances it is desirable to convert a low voltage direct current potential to a voltage of a higher potential. Several methods have been proposed to obtain a high output potential from a lower direct current input potential. Such a method, for example, is shown in my Patent 2,774,878, which is assigned to the same assignee as the present invention. The method shown in the present invention has the additional feature of providing for a decrease in the current drawn from the source when the output load current demand decreases. Such an output load may be, for example, a capacitor. As the load capacitor becomes charged it requires less power and it is often desirable to decrease the current drawn from the input source as the load capacitor becomes charged.

An object of this invention is to provide electrical inverter apparatus whereby the losses of the inverter apparatus are minimized.

A further object of this invention is to provide electrical inverter apparatus for charging a capacitor whereby the current drawn from the input potential source is maintained at a minimum.

These and other objects of the present invention will be understood upon consideration of the accompanying specification, claims and drawings of which:

Figure 1:
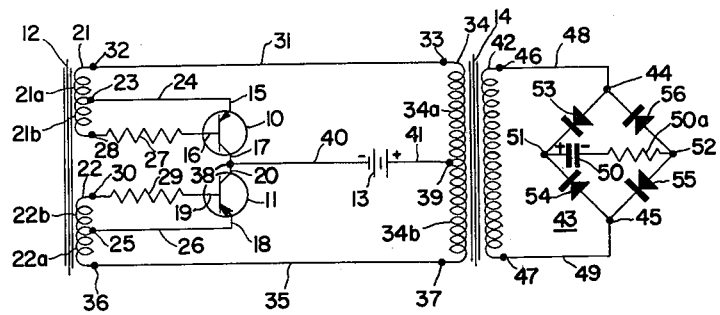
FIGURE 1 is a schematic diagram of an embodiment of my invention.

Referring now to FIGURE 1 there is shown a pair of semiconductor current controlling devices 10 and 11, here shown as junction type PNP transistors, a saturable core feedback transformed 12, a source of low voltage direct current potential 13 here shown as a battery, and an output transformed 14. Transistor 10 has a plurality of electrodes comprising an emitter electrode 15, a base electrode 16, and a collector electrode 17. Transistor 11 has a plurality of electrodes comprising an emitter electrode 18, a base electrode 19, and a collector electrode 20. Saturable core feedback transformer 12 is composed of at least windings 21 and 22. Winding 21 includes sections 21a and 21b. Winding 22 includes sections 22a and 22b.

A center tap 23 of winding 21 is directly connected to the emitter 15 of transistor 10 by means of conductor 24. A center tap 25 of winding 22 is directly connected to emitter 18 of transistor 11 by means of conductor 26. A base resistor 27 connects the base 16 of transistor 10 to an end terminal 28 of winding 21. A base resistor 29 connects the base 19 of transistor 11 to an end terminal 30 of winding 22. A conductor 31 connects the other end terminal 32 of winding 21 to a terminal 33 of a primary winding 34 of output transformer 14. Primary winding 34 includes sections 34a and 34b. A conductor 35 connects the other end terminal 36 of winding 22 to the opposite terminal 37 of output transformer primary winding 34. Collector electrodes 17 and 20 of transistors 10 and 11, respectively, are connected together at a junction 38. The battery 13 is connected between junction 38 and center tap 39 of output transformer primary winding 34 by conductors 40 and 41, respectively.

A secondary winding 42 of output transformer 14 has terminals 46 and 47 and has connected thereto a load generally designated 43. Load 43, which as shown includes a bridge rectifier circuit, has a pair of output terminals 51 and 52, and a pair of input terminals 44 and 45 connected to the transformer secondary winding output terminals 46 and 47 by means of conductors 48 and 49, respectively. A capacitor 50 and a resistor 50a are directly connected between the output terminals 51 and 52. Diodes 53, 54, 55 and 56 form the legs of a conventional bridge rectifier circuit.

*Operation of FIGURE 1*

In considering the operation of FIGURE 1 it is to be understood that transistors 10 and 11 conduct alternately. Assume that initially transistor 10 is in the conductive state. With transistor 10 in the conductive state a current path may be traced from the positive terminal of potential source 13 through conductor 41, terminal 39, section 34a, terminal 33, conductor 31, terminal 32, section 21a, terminal 23, conductor 24, emitter to collector of transistor 10, junction 38, conductor 40, and then to the negative terminal potential source 13. It is apparent that the current flowing through section 21a of feedback transformer 12 is equal to the collector current flowing through section 34a of output transformer 14.

The base drive current flowing in base resistor 27 must be of sufficient magnitude to maintain transistor 10 in the conductive state. This base drive current is proportional to the difference between the current flowing in winding 21a and the magnetization current requirements of transformer 12. Transistor 10 will continue to conduct until the core of transformer 12 saturates. When the core of transformer 12 saturates the magnetization current demand of transformer 12 increases thereby reducing the current available for the base drive current. When the base current decreases to a value such that the collector current available because of the base drive current is less than the current demanded by the total load, transistor 10 turns off. At the same time that the core of transformer 12 saturates and transistor 10 is cut off, the flux in the core of transformer 12 tends to collapse thereby inducing voltage in sections 21b and 22b of a polarity opposite to that when transistor 10 was conductive. Therefore the tendency of the magnetic flux to collapse in feedback transformer 12 induces a voltage in section 22b of such polarity as to render transistor 11 conductive and induces a voltage in section 21b of such polarity as to render transistor 10 non-conductive.

With transistor 11 now in the conductive state, a current path may be traced from the positive terminal of potential source 13, through conductor 41, terminal 39, winding 34b, terminal 37, conductor 35, end terminal 36, winding 22a, center tap 25, conductor 26, through the emitter to collector of transistor 11, junction 38, conductor 40, and back to the negative terminal of potential source 13. The current flowing through section 22a is equal to the collector current flowing through section 34b. The base current flowing through base resistor 29 must be of sufficient magnitude to maintain transistor 11 in the conductive state. This base drive current is proportional to the difference between the current flowing in winding 22a and the magnetization current of transformer 12. Transistor 11 will remain in the conductive state until the core of transformer 12 saturates. When the core of transformer 12 saturates, the magnetization current demand of transformer 12 increases, thereby reducing the current available for the base drive current. When the base current becomes low enough so that the collector current available because of the base current drive is less than the current demanded by the total load, transistor 11 turns off. When the transistor 11 turns off the flux in transformer 12 tends to collapse thereby inducing voltages in sections 21b and 22b of such polarity as to render transistor 10 conductive and transistor 11 non-conductive.

From the above discussion it can be seen that an alternate conduction of transistors 10 and 11 produces an alternating current type potential in output transformer 14. With transistor 10 in the conductive state transformer output terminal 47 is positive with respect to transformer output terminal 46 and a current path may be traced from terminal 47 through conductor 49, bridge input terminal 45, diode 54, bridge output terminal 51, load capacitor 50, load resistor 50a, bridge output terminal 52, diode 56, bridge input terminal 44, conductor 48, and then to the negative terminal 46 of output secondary winding 42.

With transistor 11 in the conductive state, transformer output terminal 46 is positive with respect to transformer output terminal 47 and a current path may be traced from transformer output terminal 46 through conductor 48, bridge input terminal 44, diode 53, bridge output terminal 51, capacitor 50, resistor 50a, bridge output terminal 52, diode 55, bridge input terminal 45, conductor 49 and then to the negative terminal 47 of output transformer secondary winding 42.

The current flowing through the bridge rectifier circuit places a charge on the capacitor 50 of such polarity as to oppose the current flowing through output transformer secondary winding 42. As capacitor 50 becomes more fully charged, there will be less current flowing through secondary winding 42 and therefore there will be less current flowing through primary sections 34a and 34b. Since the magnetization current requirements of transformer 12 are substantially constant until the core of transformer 12 saturates, it can be seen that with a reduced current flowing through sections 34a and 34b there will be less current available for the base drive current. With a decreased load current demand there is a decreased feedback current so that the transistors 10 and 11 are caused to conduct less as the load current demand decreases and therefore less current will be drawn from input potential source 13. Ultimately when the capacitor 50 becomes charged to a predetermined level a minimal current will be drawn from potential source 13 thereby increasing the lifetime of said source. With less current flowing through the primary winding of output transformer 14, there will be less current flowing through sections 21a and 22a when transistors 10 and 11, respectively, are conductive. With less current flowing through sections 21a and 22a, the base drive current available to turn on transistors 10 and 11 respectively decreases. A reduction in the base drive current tends to decrease the input power dissipation in transistors 10 and 11 thereby increasing the lifetime of potential source 13.

Figure 2:
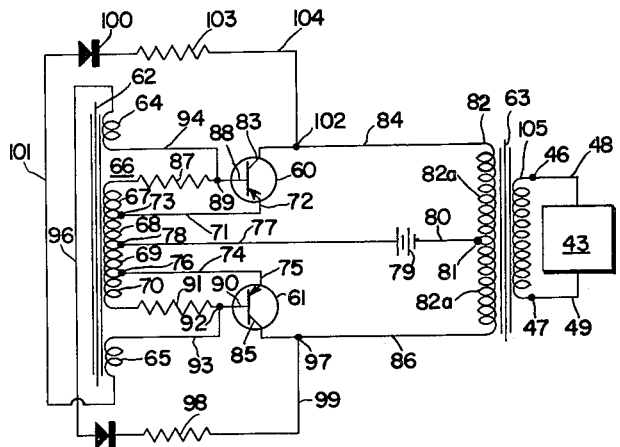
FIGURE 2 is a schematic diagram of another embodiment of my invention.

Referring now to FIGURE 2 there is shown a pair of semiconductor current controlling devices 60 and 61, here shown as junction type PNP transistors connected in circuit with a saturable core feedback transformer 62 and an output transformer 63. Saturable core feedback transformer 62 has voltage feedback windings 64 and 65 and a current feedback winding. The current feedback winding generally designated 66 includes sections 67, 68, 69 and 70. A conductor 71 connects the emitter 72 of transistors 60 to tap 73 of winding 66. A conductor 74 connects the emitter 75 of transistor 61 directly to tap 76 of winding 66. A conductor 77 directly connects a tap 78 of winding 66 to the positive terminal of an input potential source here shown as a battery 79. A conductor 80 directly connects the negative terminal of potential source 79 to a center tap 81 of output transformer primary winding 82. Output transformer primary winding 82 comprises sections 82a and 82b. The upper end terminal of output transformer primary section 82a is connected to collector electrode 83 of transistor 60 by a conductor 84. The lower end terminal of output transformer primary section 82b is connected to collector electrode 85 of transistor 61 by a conductor 86. A base resistor 87 connects the upper end terminal of section 67 to base electrode 88 of transistor 60 at a junction 89. A base resistor 91 connects the lower end terminal of section 70 to the base electrode 90 of transistor 61 at a junction 92.

A conductor 93 directly connects the upper end terminal of voltage feedback winding 65 to base resistor 90 at a junction 92. Conductor 94 directly connects the lower end terminal of voltage feedback winding 64 to base resistor 87 at a junction 89. The upper end terminal of voltage feedback winding 64 is connected to a diode 95 by a conductor 96. The other terminal of diode 95 is connected to a junction 97 on conductor 86 by a resistor 98 and a conductor 99. The lower end terminal of voltage feedback winding 65 is directly connected to a diode 100 by a conductor 101. The other terminal of diode 100 is connected to a junction 102 on a conductor 84 by a resistor 103 and a conductor 104.

An output load 43 described previously is connected to a secondary winding 105 of output transformer 63 at secondary winding output terminals 46 and 47 by conductors 48 and 49, respectively.

*Operation of FIGURE 2*

In considering the operation of FIGURE 2 it is to be understood that when the inverter circuit is operating transistors 60 and 61 conduct alternately. Assume that initially neither transistor is conducting and also assume that the current demanded by load 43 is of a relatively large value. Also assume that the transformer impedance of saturable core feedback transformer 62 is unbalanced in such a manner that current will flow through the sections 67 and 68 of winding 66. Under this condition a starting current path may be traced from the positive terminal of potential source 79 through conductor 77, tap 78, section 68, section 67, base resistor 87, junction 89, conductor 94, voltage feedback winding 64, conductor 96, diode 95, resistor 98, conductor 99, junction 97, conductor 86, section 82b, tap 81, and then through conductor 80 to the negative terminal of potential source 79, The current flowing through sections 67 and 68 of current feedback winding 66 and voltage feedback winding 64 induces a voltage in section 70 of such polarity as to bias transistor 61 to a non-conductive state. This same current flow causes a voltage in section 67 of such polarity as to bias transistor 60 to the conductive state.

With transistor 60 in the conductive state a current path may be traced from the positive terminal of potential source 79 through conductor 77, tap 78, section 68, tap 73, through the emitter to collector of transistor 60, conductor 84, section 82a, tap 81, conductor 80 and then to the negative terminal of potential source 79. It is apparent that the current flowing through section 68 is substantially equal to the current flowing through section 82a. The base drive current available to maintain transistor 60 conductive is proportional to the difference between the current flowing in section 68 and the magnetization current available for the core of feedback transformer 62. Transistor 60 will remain in the conductive state until such time as the core of transformer 62 saturates. Upon saturation of the core of transformer 62, the magnetization current demanded by the core of transformer 62 increases thereby decreasing the available base drive current. When the base current becomes low enough so that the collector current available because of this base current drive is less than the current demanded by the total load, transistor 60 tends to turn off. When transistor 60 tends to turn off the flux in transformer 62 tends to collapse thereby inducing voltages in sections 67 and 70 of a polarity opposite to that when transistor 60 was conducting. The collapse of the flux of transformer 62 induces voltages in sections 67 and 70 of such polarity that transistor 60 is biased to the non-conductive state and transistor 61 is biased to the conductive state.

With transistor 61 in the conductive state a current path may be traced from the positive terminal of potential source 79, through conductor 77, tap 78, section 69, tap 76, conductor 74, through the emitter to collector of transistor 61, conductor 86, section 82b, tap 81, conductor 80 and then to the negative terminal potential source 79. The current flowing through section 69 of the saturable core feedback transformer 62 is equal to the current flowing in section 82b. The base drive current available to maintain transistor 61 in the conductive state is proportional to the difference between the current flowing in section 69 and the magnetization current demanded by the core of transformer 62. Transistor 61 will remain in the conductive state until such time as the core of saturable core feedback transformer 62 saturates. Upon saturation of the core of transformer 62, the magnetization current demanded by transformer 62 increases and thereby decreases the available base drive current. When the base drive current becomes low enough so that the collector current available from transistor 61 because of the base drive current is less than the current demanded by the total load, transistor 61 turns off. When transistor 61 turns off the flux in transformer 62 tends to collapse thereby inducing a voltage in section 67 of such polarity as to bias transistor 60 to the conductive state and induces a voltage in section 70 of such polarity as to bias transistor 61 to the non-conductive state.

Thus it can be seen that the alternate conduction of transistors 60 and 61 induces an alternating current type potential in the output transformer 63. The potential induced in secondary winding 105 of output transformer 63 is then applied to the load 43. As the capacitor 50 of load 43 acquires more charge, the load current flowing through secondary winding 105 of output transformer 63 decreases; the current flowing through sections 82a and 82b also decreases thereby causing less current to flow through sections 68 and 69 of feedback transformer 62. Since the magnetization current demand of transformer 62 is substantially constant until the core of transformer 62 saturates, a decrease in the current flowing through sections 68 and 69 decreases the current available for the base drive current of transistors 60 and 61. A decrease in the current available for the base drive current tends to decrease the input power dissipation in transistors 60 and 61. Thus it is apparent that as the load current demand decreases there is less current drawn from potential source 79. When the capacitor 50 becomes charged to a predetermined value only a minimal current will be drawn from potential source 79 thereby increasing the lifetime of said source.

Throughout the condition time of either transistor a current path may be traced through either of the voltage feedback windings. For example, with transistor 60 in the conductive state there will be a current path through voltage feedback winding 64 in the manner previously disclosed when discussing the starting of the embodiment of my invention shown in FIGURE 2. With transistor 61 in the conductive state a current path may be traced from the positive terminal of potential source 79 through conductor 77, tap 78, section 69, section 70, base resistor 91, junction 92, conductor 93, voltage feedback winding 65, conductor 101, diode 100, resistor 103, conductor 104, junction 102, conductor 84, section 82a, tap 81, conductor 80 and then to the negative terminal of potential source 79. The feedback effect of the current flowing through voltage feedback windings 64 and 65 complements the feedback effect of the output current flowing through sections 68 and 69. Under the assumption that there is initially a relatively large demand for current from the load 43, there is then a large demand for current from potential source 79.

When the current demand of load 43 is relatively large the current flowing through either section 68 or 69 dominates the feedback effect of the current flowing through either voltage feedback winding 64 or 65. When the current demanded by load 43 decreases there will be less current flowing through sections 82a and 82b of output transformer 63. Because of less current flowing through sections 82a and 82b there will be less current flowing through sections 68 and 69, respectively. This decrease in current flowing through sections 68 and 69 will decrease the feedback current to sections 67 and 70, respectively, and therefore the current flowing through voltage feedback windings 64 and 65 will become more dominant in the feedback operation of saturable core feedback transformer 62. The current flowing through voltage feedback windings 64 and 65 is sufficient to maintain the alternate conduction of transistors 60 and 61 when the load current demand decreases or is temporarily removed.

When less current is demanded by the load 43 less current will also be demanded from potential source 79. At some point in the operation, if the current demanded by load 43 decreases to a predetermined value, the current demanded from potential source 79 will decrease to a minimum value thereby increasing the lifetime of potential source 79.

While I have shown certain embodiments of my invention, it is apparent that modifications of this circuit may be made without departing from the spirit of the invention.

I claim as my invention:

1. Electrical apparatus comprising: output transformer means having a secondary winding and a primary winding, said primary winding having a center tap and two end terminals; load means connected in circuit with said secondary winding; oscillator means, said oscillator means including a plurality of current feedback loops, a two winding saturable core feedback transformer, each of said windings having an intermediate tap and two end terminals, and a plurality of semiconductor amplifying means, each of said semiconductor amplifying means having a plurality of electrodes including an input electrode, an output electrode and a control electrode; a direct current potential source connected interjacent said output electrodes and said primary winding center tap; means including one of said feedback winding end terminals and said feedback winding intermediate tap connecting a portion of each of said feedback transformer windings interjacent said control electrode and said input electrode of each of said semiconductor amplifying means; means connecting the remainder end terminals of each of said feedback windings in circuit with said output transformer primary winding end terminals whereby an output current path is completed thereby enabling said current feedback loops to control the input signal to said oscillator means in accordance with the output current.

2. Electrical apparatus comprising; output transformer means having a secondary winding and a center tapped primary winding; load means connected in circuit with said secondary winding; oscillator means, said oscillator means including first and second transistors, each of said transistors having an emitter electrode, a collector electrode and a base electrode; a multiple winding saturable core feedback transformer having a plurality of separate voltage feedback windings and a poly tapped current feedback winding; means connecting a first portion of said current feedback winding interjacent the emitter electrode and the base electrode of said first transistor; means connecting a second portion of said current feedback winding interjacent the emitter electrode and the base electrode of said second transistor; means connecting a first voltage feedback winding interjacent the collector electrode of said first transistor and the base electrode of said second transistor; means connecting a second voltage feedback winding interjacent the collector electrode of said second transistor and the base electrode of said first transistor; a direct current potential source; means connecting said potential source interjacent one of said taps of said current feedback winding and said center tap of said output transformer primary winding; and further means connecting said collector electrodes in circuit with said output transformer primary winding whereby a plurality of voltage and current feedback loops including a biasing circuit; and an output current path are completed thereby enabling said feedback loops to control the drive to said transistors in accordance with the output current.

3. Electrical apparatus comprising; output transformer means having a secondary winding and a center tapped primary winding; capacitive load means connected in circuit with said secondary winding; oscillator means, said oscillator means including first and second transistors, each of said transistors having an emitter electrode, a collector electrode and a base electrode; a multiple winding saturable core feedback transformer having a plurality of voltage feedback windings and a poly tapped current feedback winding; means connecting a first portion of said current feedback winding interjacent the emitter electrode and the base electrode of said first transistor, means connecting a second portion of said current feedback winding interjacent the emitter electrode and the base electrode of said second transistor; means connecting a first voltage feedback winding interjacent the collector electrode of said first transistor and the base electrode of said second transistor; means connecting a second voltage feedback winding interjacent the collector electrode of said second transistor and the base electrode of said first transistor; a direct current potential source; means connecting said potential source interjacent one of said taps of said current feedback winding and said center tap of said output transformer primary winding; and further means connecting said collector electrodes in circuit with said output transformer primary winding whereby a plurality of current and voltage feedback circuits including a biasing circuit, and an output current path are completed thereby enabling said feedback loops to control the drive to said transistors in accordance with the charge on said capacitive load means.

4. Electrical apparatus comprising, output means including load means, said output means having a plurality of input terminals; electrical oscillator inverter means comprising transducer means having input and output terminals; a direct current potential source connected between one of said electrical transducer means output terminals and one of said output means input terminals; conductive means comprising the primary winding of a current transformer connecting said output terminals of said electrical transducer means in circuit with the other of said output means input terminals; current feedback means comprising a secondary winding on said current transformer energized in proportion to the current in said connective means, said current feedback means connected interjacent the input terminals of said electrical transducer means; and further voltage feedback means connecting said output means input terminals in circuit with said transducer means input terminals whereby a plurality of voltage and current feedback loops including a biasing circuit are completed thereby enabling said feedback loops to control the input signal to said transducer means in accordance with the output current.

5. Electrical means comprising; output means including capacitive load means, said output means having a plurality of input terminals; electrical oscillator inverter means comprising transducer means having input and output terminals; a direct current potential source connected between one of said electrical transducer means output terminals and one of said output means input terminals; conductive means comprising the primary winding of a current transformer connecting said output terminals of said electrical transducer means in circuit with the other of said output means input terminals; current feedback means comprising a secondary winding on said current transformer, said current feedback means connected interjacent the input terminals of said electrical transducer means, said current transformer secondary winding being energized in proportion to the output current in said primary; and further voltage feedback means connecting said output means input terminals in circuit with said transducer means input terminals whereby a plurality of current and voltage feedback loops including a biasing circuit, and an output current path are completed thereby enabling said feedback loops to control the input signal to said electrical transducer means in accordance with charge on said capacitive load means.

6. Electrical inverter apparatus comprising; output transformer means having a secondary winding and a center tapped primary winding; load means connected in circuit with said secondary winding; oscillator means, said oscillator means including a two winding saturable core feedback transformer and a plurality of transistors, each of said transistors having an emitter electrode, a collector electrode and a base electrode; a direct current potential source connected interjacent said collector electrodes and said primary winding center tap; means connecting a first portion of each of said feedback transformer windings interjacent said base electrode and said emitter electrode of each of said transistors; means conductively connecting the remainder portion of each of said feedback windings in series circuit with said output transformer primary winding and said transistor whereby an output current path is completed through said remainder portion and said primary winding thereby enabling said first portion feedback loops to control the drive current to said transistors in accordance with the output current in said remainder portion.

7. Electrical apparatus comprising; output transformer means having a secondary winding and a center tapped primary winding; capacitive load means connected in circuit with said secondary winding; oscillator means, said oscillator means including a plurality of current feedback loops, a two winding saturable core feedback transformer and a plurality of transistors, each of said transistors having an emitter electrode, a collector electrode and a base electrode; a direct current potential source connected interjacent said collector electrodes and said primary winding center tap; means connecting a portion of each of said feedback transformer windings interjacent said base electrode and said emitter electrode of each of said transistors; means conductively connecting the remainder portion of each of said feedback windings in series circuit with said output transformer primary winding and said transistor whereby the output circuit is completed only by virtue of the series connection of said remainder portion of said feedback winding with said output transformer primary winding so that an output current path is completed thereby enabling said feedback means to control the drive current to said transistors in accordance with the charge on said capacitive load means.

8. Electrical apparatus comprising: output means including capacitive load means and having a plurality of input terminals; oscillator means having input and output terminals, current controlling means and a plurality of current feedback loops; means connecting a direct current potential source interjacent one of said oscillator means output terminals and one of said output means input terminals, and further means including transformer primary winding means in said current feedback loops conductively connecting said oscillator means input terminals primary winding means and said current controlling means in series with the remainder output means input terminals whereby the output circuit is completed only by virtue of the conductive series connection of said oscillator input terminals together with said output means input terminals so that a conductive current coupled feedback loop and output current path is completed thereby enabling said current feedback loops to control the input signal to said oscillator means in accordance with the charge on said capacitive load means.

9. Electrical inverter apparatus comprising: transistor oscillator means having input and output terminals and comprising transistor means; output means including capacitive load means, said output means having a plurality of input terminals; means connecting a battery to one terminal of said output means; current feedback primary winding means; means conductively connecting said current feedback transformer primary winding in series with said output means and said transistor means to complete the circuit from said battery through said output means said feedback transformer primary and the output electrodes of said transistor means; and a current feedback loop comprising a secondary winding of said current transformer connected to the input terminals of said transistor means whereby an output current path and a regenerative feedback path is completed thereby enabling said current feedback loop to vary the signal to said transistor means as a function of the output current.

10. Electrical inverter apparatus comprising; output means including load means and having a plurality of input terminals; inverter means comprising electronic current control means and having input and output terminals said inverter means also comprising feedback transformer means having primary and secondary winding means; direct current conductive means including said input terminals of said output means connecting a direct current potential source through said electronic current control means output terminals and through said primary winding means; and a current feedback loop conductively connected to said direct current conductive means and to the input terminals of said transducer means in a series loop whereby the output circuit is completed only by virtue of the series connection of said inverter means input terminals, said current feedback loop and said output means input terminals so that an output current path and a current feedback path is completed thereby enabling said feedback loop to control the input signal to said electrical transducer means as a function of the output current.

11. Electrical apparatus comprising; output means including capacitive load means, said output means having a plurality of input terminals; inverter means comprising electrical transducer means having input and output terminals; direct current conductive means including primary winding means of current transformer means and the input terminal of said output means connected in a series circuit through said electrical transducer means output terminals to a direct current potential source; and current feedback loop means comprising a secondary winding of said current transformer means connected to the input terminals of said transducer means whereby an output current path and a regenerative feedback path is completed thereby enabling said current feedback loop means to control the input signal magnitude to said electrical transducer means as an inverse function of the charge on said capacitive load means.

12. Electrical apparatus comprising; output means including load means having a plurality of input terminals; semiconductor oscillator means comprising semiconductor current controlling means having input and output terminals; direct current conductive circuit means including the input terminals of said output means, a current transformer primary winding and said semiconductor current controlling means in series connecting a direct current potential source in energizing relation to said oscillator means output terminals; and further circuit means including a current feedback loop comprising a further winding on said current transformer connecting said oscillator means input terminals in circuit with the direct current conductive means, said further winding being energized in proportion to the current flowing in said output means whereby an output current path and a coupled current feedback path is completed thereby enabling said current feedback loop to vary the input signal to said semiconductor oscillator means as a function of the output current.

13. Oscillator apparatus having a feedback drive current variable as a function of the oscillator output comprising: oscillator means comprising, semiconductor amplifying means, said semiconductor means having control elements for varying the flow of current through the semiconductor means output circuit; a source of unidirectional potential; output transformer means having primary and output windings; load means connected to said transformer output winding; direct current conductive circuit means including in series a primary winding of a current feedback transformer, and the primary winding of said transformer means for connecting the output circuit of said semiconductor means to said potential source, whereby the current flowing in the output circuit of said semiconductor means also flows in said current transformer winding; and current feedback means, said current feedback means including another winding of said current feedback transformer, said current feedback means being connected in current controlling relation to the control elements of said semiconductor amplifying means, said current feedback means being energized by the current flowing in said circuit means so that the control signal current to said semiconductor amplifying means is reduced as the load current is reduced.

References Cited in the file of this patent

UNITED STATES PATENTS

| 2,748,274 | Pearlman | May 29, 1956 |
| 2,843,815 | Driver | July 15, 1958 |
| 2,849,615 | Gustafson | Aug. 26, 1958 |
| 2,854,582 | Guyton | Sept. 30, 1958 |
| 2,883,539 | Bruck et al. | Apr. 21, 1959 |